United States Patent [19]
Gliemeroth

[11] 3,932,690
[45] Jan. 13, 1976

[54] TRANSPARENT, PHOTOTROPIC LAMINATE

[75] Inventor: Georg Gliemeroth, Mainz-Finthen, Germany

[73] Assignee: Jenaer Glaswerk Schott & Gen., Mainz, Germany

[22] Filed: Apr. 29, 1974

[21] Appl. No.: 464,963

[30] Foreign Application Priority Data
Apr. 30, 1973 Germany............................ 7316334

[52] U.S. Cl. ......... 428/432; 350/160 P; 350/160 R; 428/537
[51] Int. Cl.² ........................................ B32B 17/06
[58] Field of Search ....... 161/1, 192, 199, 203, 410; 350/160 P, 160 R; 428/432, 537

[56] References Cited
UNITED STATES PATENTS

| | | | |
|---|---|---|---|
| 3,197,296 | 7/1965 | Eppler et al. | 350/160 P |
| 3,219,993 | 11/1965 | Schwertz | 350/160 R X |
| 3,266,370 | 8/1966 | Marks et al. | 350/160 R X |
| 3,436,353 | 4/1969 | Dreyer et al. | 350/160 P X |
| 3,466,216 | 9/1969 | Cooley | 350/160 P X |
| 3,512,869 | 5/1970 | Plumat et al. | 350/160 R |
| 3,561,269 | 2/1971 | Seitz | 350/160 P X |

*Primary Examiner*—Mayer Weinblatt
*Attorney, Agent, or Firm*—Littlepage, Quaintance, Murphy & Dobyns

[57] ABSTRACT

A transparent phototropic laminate comprising a light transmitting substrate, a inorganic phototropic layer attached to the substrate and a polymeric layer attached to the phototropic layer.

8 Claims, 4 Drawing Figures

11  12  13  14

21  22  23  24

31  32  33

41  42  43

TRANSPARENT, PHOTOTROPIC LAMINATE

Phototropism denotes the property of certain materials of reacting to exposure to actinic light by an increase in the absorption thereof, i.e., by assuming a darker color. In darkness, such materials whiten again. This reversible process termed phototropism should be capable of being repeated any number of times without fatigue.

Methods for improving the mechanical and thermal properties of laminates by combining plastic materials with standard glass are already known. Laminates are also used for dimming intensive light rays. The dimming can be produced by using dyed plastic materials in the laminate. Alternatively, it can be based on the incongruity of the indices of refraction of glass and plastic material. It is a disadvantage that such a laminate of plastic material and glass, or of one plastic material with another plastic material, have a transparency which is independent of light irradiation intensity and always remains constant. Unfortunately these laminates always transmit, the same percentage of the amount of light that strikes them. Furthermore, they do this independently of the time of day or season of the year.

Processes of manufacturing phototropic materials are known. The employment of plastic materials, containing phototropic components of organic or inorganic orgin, is likewise known. However, the phototropism of organic materials in laminates fatigues rapidly.

Furthermore, laminates are known wherein two non-phototropic glass sheets are placed on either side of a solid of liquid organic phototropic material. Such laminates have the same disadvantages as the aforementioned phototropic plastic materials employing organic phototropic materials.

Moreover, laminates of plastic material and glass are known wherein one or more phototropic glass sheets are combined with other, commercial plate glass and/or special glass with a polymerized plastic sheet inserted between these glasses, to provide a single phototropic laminate.

The disadvantages of such a laminate is the high cost of special glasses, the frequently occuring low chemical stability, and the technological difficulties inherent in the manufacture of convex, phototropic laminates.

Accordingly it is an object of the present invention to provide an improved phototropic laminate substantially free of one or more of the disadvantages of prior laminates.

Another object is to provide an improved phototropic laminate that can be manufactured employing commercial plate glass.

Yet another object is to provide an improved phototropic laminate that does not suffer from the disadvantages inherent in the use of organic phototropic materials.

Additional objects and advantages of the present invention will be apparent to those skilled in the art by reference to the following detailed description and drawings wherein.

The above and other objects are accomplished according to the present invention by providing a transparent phototropic laminate comprising a light transmitting substrate, a light transmitting phototropic layer consisting essentially of an inorganic phototropic material attached to the substrate and a light transmitting polymeric layer attached to the phototropic layer. Organic additives to the phototropic material are not needed to get phototropic behavior of the laminate. The transparent phototropic laminates of the present invention pass less light in the presence of actinic light than in the absence of actinic light. The light transmitting substrate can be conventional plate glass or plastic such as polymethylmethacrylate.

In the broadest aspects of the present invention any inorganic phototropic material which darkens in the presence of actinic light can be employed in the light transmitting phototropic layer. However, the preferred phototropic material is the mixture of copper halides and silver halides. No organic compound should be added. It is most preferably a mixture of CuX and AgX present in a molar ratio of generally 1:10 to 10:1 and preferably 3:10 to 10:3. X can be any halogen but is preferably chlorine or bromine. Most preferably the halogen is employed with the copper and with the silver. In one preferred embodiment of the present invention the phototropic layer consists of forty to sixty atomic percent of silver ions, 2 to 60 atomic percent of copper ions and 15 to 87 atomic percent of chlorine or bromine ions.

The phototropic material can be attached to the remainder of the laminate in any convenient manner but is preferably attached by vacuum deposition of the phototropic material either on the substrate or on the polymeric layer. The phototropic material can be deposited in widely varying thicknesses depending upon the degree of light transmission desired but is generally deposited in a thickness of 100 to 1,000 and preferably 200 to 600 nanometers (nm).

The light transmitting polymeric layer can be of any polymer which does not adversely affect the characteristics of the laminate but is preferably of polyvinyl butyrate.

The invention is further illustrated by the following examples in which all parts of percentages are by weight unless otherwise indicated. These non-limiting examples are illustrative of certain embodiments designed to teach those skill to the art how to practice the invention and to represent the best mode contemplated for carrying out the invention.

EXAMPLE 1

Figure 1:
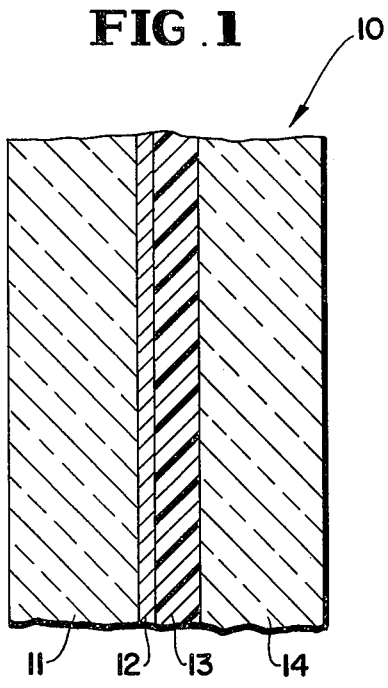
FIG. 1 is a schematic sectional view of a laminate of the present invention.

The laminate 10 shown in FIG. 1 is a phototropic compound system of plastic material and glass. It consists of a glass substrate 11, 3 mm in thickness and approximately 1 square meter in size, with a transmission of 92 percent, an index of refraction of 1.49, a Tg of 480°C, and an $\alpha$ of $92 \times 10^{-7}$/° C. One side of the substrate 11 is covered with an inorganic phototropic layer 12 composed of 40.85 percent by weight - CuCl and 59.15 percent by weight - AgCl, and which was deposited by evaporation at $10^{-5}$ torr (1 mm Hg pressure) in a thickness of 350 nm, adjacent to the layer 12, an elastic plastic sheet 13 of polyvinyl 0.4 mm in thickness butyrate, soaked for five minutes in phthalic acid diethyl ester is pasted, and on top of this foil a glass plate 14 having the same dimensions and properties as the substrate 11.

This phototropic laminate 10 has in the unexposed state a blue-gray color at an initial transmission of 65 percent. After 15 minutes of exposure to actinic light the laminate 11 is dark blue and has a saturation transmission of 23 percent. The half-crest value time of the regeneration is approximately 5 minutes.

EXAMPLE 2

Figure 2:
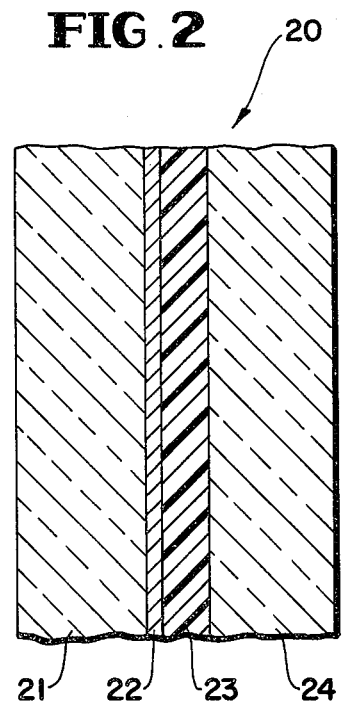
FIG. 2 is a schematic sectional view of an alternative laminate of the present invention.

The laminate 20 shown in FIG. 2 comprises a compound system of plastic material and glass. It consists of a polyvinyl butyrate foil 23, 0.4 mm in thickness, with an inorganic phototropic layer 22, composed of 65.48 percent by weight - AgBr and 34.52 percent by weight CuBr which was deposited by evaporation at $10^{-5}$ torr and whose thickness is 400 nm. This foil is inserted between two glass plates 21, 24, 1 square meter in size and 4 mm in thickness having a transmission of 93 percent, a Tg of 520° C and an $\alpha$ of $30 \times 10^{-7}/°$ C. The glass plates 21, 24 are drawn sheets and are pretreated, for the purpose of improving their adhesive strength, for 1 minute with silicon methylate. The color of the laminate 20 in the unexposed state is olive. It has an initial transmission of 68 percent. After 15 minutes of exposure to actinic light the laminate 20 is brown-green and has a saturation transmission of 43 percent. The half-crest value time of the regeneration amounts to 150 minutes.

EXAMPLE 3

Figure 3:
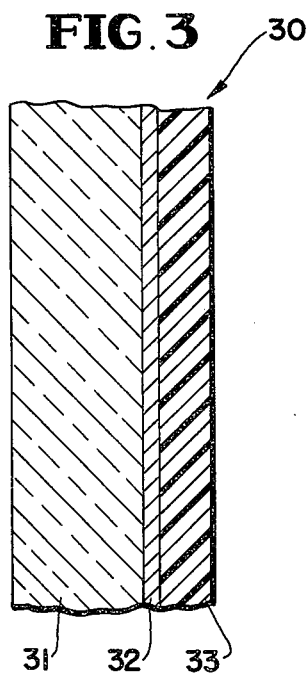
FIG. 3 is a schematic sectional view of still another alternative laminate of the present invention.

The laminate 30 shown in FIG. 3 comprises a plastic material and glass, consisting of a glass plate 31, 1 square meter in size and 3 mm in thickness, with an initial transmission of 94 percent, an index of refraction of 1.523, a Tg of 480° C and an $\alpha$ of $92 \times 10^{-7}/°$ C. The glass plate 31 is covered with a unilateral, inorganic, phototropic immersion layer 32, 300 nm in thickness and composed of 61.68 percent by weight AgBr and 38.32 percent by weight CuBr. A polyvinyl butyrate foil 33 of green color, 0.4 mm in thickness, and pretreated as in Example 1 is pasted upon the covered surface.

The laminate 30 has in the unexposed state, at an initial transmission of 58 percent, a green color which, after 15 minutes of exposure to actinic light, changes to gray-green and has a saturation transmission of 22 percent. The half-crest value time of regeneration is 25 minutes.

EXAMPLE 4

Figure 4:
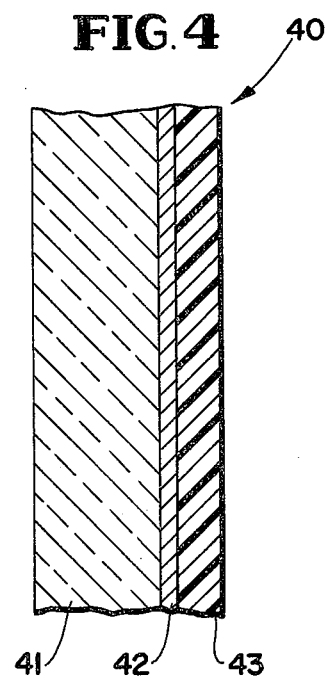
FIG. 4 is another schematic sectional view of still another laminate.

The laminate 40 shown in FIG. 4 comprises a compound of plastic material and glass wherein a polyvinyl butyrate foil 43, 0.4 mm in thickness and 1 square meter in size, on which an inorganic phototropic material 42 composed of 65.48 percent by weight AgBr and 34.52 percent by weight CuBr is deposited by evaporation upon the aforementioned foil 43 at $10^{-5}$ torr, is combined with a "GL-30 A" ground filter glass plate 41, 1 square meter in size and 2 mm in thickness.

The foil 43 is pasted with the covered side upon filter glass plate 41 whose transmission is 75 percent, whose index of refraction is 1.530, and whose $\alpha$ is $130 \times 10^{-7}/°$. The laminate 40 has a brown-green color in the unexposed state. The initial transmission is 60 percent. After 15 minutes of exposure to actinic light rays, the saturation transmission is 17 percent, and the laminate 40 has assumed a dark olive color. The half-crest value time of the regeneration is 40 minutes.

EXAMPLE 5

A further laminate, not shown, employs only plastic lamina. A sheet of polymethylemethacrylate, of a surface of 1 square meter and a thickness of 5 mm, is covered with a layer of an inorganic, phototropic material similar to the layer 12 of Example 1. A foil of polyvinyl butyrate is pasted upon the sheet on the covered side, and the sheet is combined with a further sheet of polymethylmethacrylate to form a laminate.

The sheets of polymethylmethacrylate have an index of refraction of 1.5 and a transmission of 90 percent.

The color of the laminate is, in the unexposed state, light brown at an initial transmission of 65 percent. After 15 minutes of exposure to actinic light, the saturation transmission is approximately 20 percent. The laminate is of dark brown color and has a half-crest value of regeneration of 25 minutes.

EXAMPLE 6

The laminate not shown comprises two plastic materials. A polyvinyl butyrate foil, 0.4 mm in thickness on which a phototropic layer similar to that of Example 4 is deposited by evaporation, is glued upon a sheet of polymethylmethacrylate, in such a manner that the layer of inorganic, phototropic material on the foil is in contact with the polymethylmethacrylate sheet.

The color of the laminate is green at an initial transmission of 78 percent. After an exposure to actinic light for 15 minutes, the system is gray-green and has a saturation transmission of 22 percent. The half-crest value time of the regeneration is 50 minutes.

Although the invention has been described in considerable detail with reference to certain preferred embodiments thereof, it will be understood that variations and modifications can be effected within the spirit and scope of the invention described above and as defined in the appended claims.

What is claimed is:

1. A transparent laminate that passes less light in the presence of actinic light than in the absence of actinic light, said laminate comprising:
   A. a light-transmitting substrate selected from the group consisting of glass and transparent plastic sheet;
   B. a light-transmitting phototropic layer consisting essentially of silver halides and copper halides which darkens in the presence of actinic light said phototropic layer being attached to the substrate;
   C. a light-transmitting plastic sheet layer attached to the phototropic layer.

2. A transparent phototropic laminate of claim 1 further comprising:
   D. a light-transmitting layer selected from the group consisting of glass and transparent plastic sheet said layer being attached to the light-transmitting plastic sheet, designated C.

3. A transparent phototropic laminate of claim 1 wherein the phototropic material is a mixture of copper halides and silver halides wherein the halide is chloride or bromide.

4. A transparent phototropic laminate of claim 1 wherein the phototropic material consists essentially of 4 to 60 atomic percent of silver ions, 2 to 60 atomic percent of copper ions, and 15 to 87 atomic percent of Cl or Br.

5. A transparent phototropic laminate of claim 2 wherein a coloring material is included in one or more of the layers identified above as layer A, layer C and/or layer D.

6. A transparent phototropic laminate that passes less light in the presences of actinic light than in the absence of actinic light, said laminate comprising:
   A. a light transmitting substrate selected from the group consisting of glass and plastic;
   B. a vacuum deposited light transmitting phototropic layer consisting essentially of CuX and AgX in a molar ratio of 3:10 to 10:3 wherein X is Cl or Br; said phototropic layer being attached to the substrate;
   C. a light transmitting polymeric layer of polyvinyl butyrate attached to the phototropic layer.

7. A transparent phototropic laminate that passes less light in the presence of actinic light than in the absence of actinic light, said laminate consisting essentially of:
   A. a light-transmitting substrate;
   B. a vacuum deposited light-transmitting phototropic layer consisting essentially of CuX and AgX in a molar ratio of 3:10 to 10:3 wherein X is Cl or Br; said phototropic layer being attached to the substrate;
   C. a layer of polyvinyl butyrate attached to the phototropic layer.

8. A transparent phototropic laminate that passes less light in the presences of actinic light than in the absence of actinic light, said laminate having:
   A. a light-transmitting substrate;
   B. a light-transmitting phototropic layer consisting essentially of CuX and AgX in a molar ratio of 1:10 to 10:1 wherein X is halogen; said phototropic layer being attached to the substrate;
   C. a light-transmitting layer attached to the phototropic layer.

* * * * *